United States Patent [19]
Podolan

[11] 3,868,788
[45] Mar. 4, 1975

[54] VEHICLE WINDOW STABILIZING MECHANISM

[75] Inventor: Edward G. Podolan, Utica, Mich.

[73] Assignee: General Motors Corporation, Detroit, Mich.

[22] Filed: Oct. 19, 1973

[21] Appl. No.: 407,903

[52] U.S. Cl.................... 49/374, 49/349, 49/350
[51] Int. Cl.............................................. E05f 11/38
[58] Field of Search ............ 49/372, 374, 375, 211, 49/227, 348-353, 502, 220

[56] References Cited
UNITED STATES PATENTS
1,812,041  6/1931  Esbjornson ......................... 49/472
2,001,778  5/1935  Field ................................... 49/211

Primary Examiner—Kenneth Downey
Attorney, Agent, or Firm—H. Furman

[57] ABSTRACT

A stabilizing mechanism for a vehicle body window includes a stabilizer bracket non-rotatably attached to the lower edge portion of the window panel and a stabilizer stop adjustably attached to a body panel. The lower edge portion of the stabilizer bracket is reversely bent to provide a retrorse flange opening upwardly toward the stabilizer stop. The upper edge portion of the stabilizer stop is reversely bent to provide a retrorse flange opening downwardly toward the window panel and the stabilizer bracket. When the window is raised, the upper edge portion of the stabilizer bracket is received in the retrorse flange at the upper edge of the stabilizer stop while the retrorse flange at the lower edge of the stabilizer bracket captures the lower edge portion of the stabilizer stop. As well as lateral inboard and outboard movement of the window stabilizing assemblies of this type are provided at both forward and rearward locations on the body panel so as to prevent pitching movement of the window about an axis normal to the window. The adjustable attachment of the stabilizer stop to the door inner panel permits adjustment of the stabilizer stop to provide the desired stabilized position of the window.

3 Claims, 4 Drawing Figures

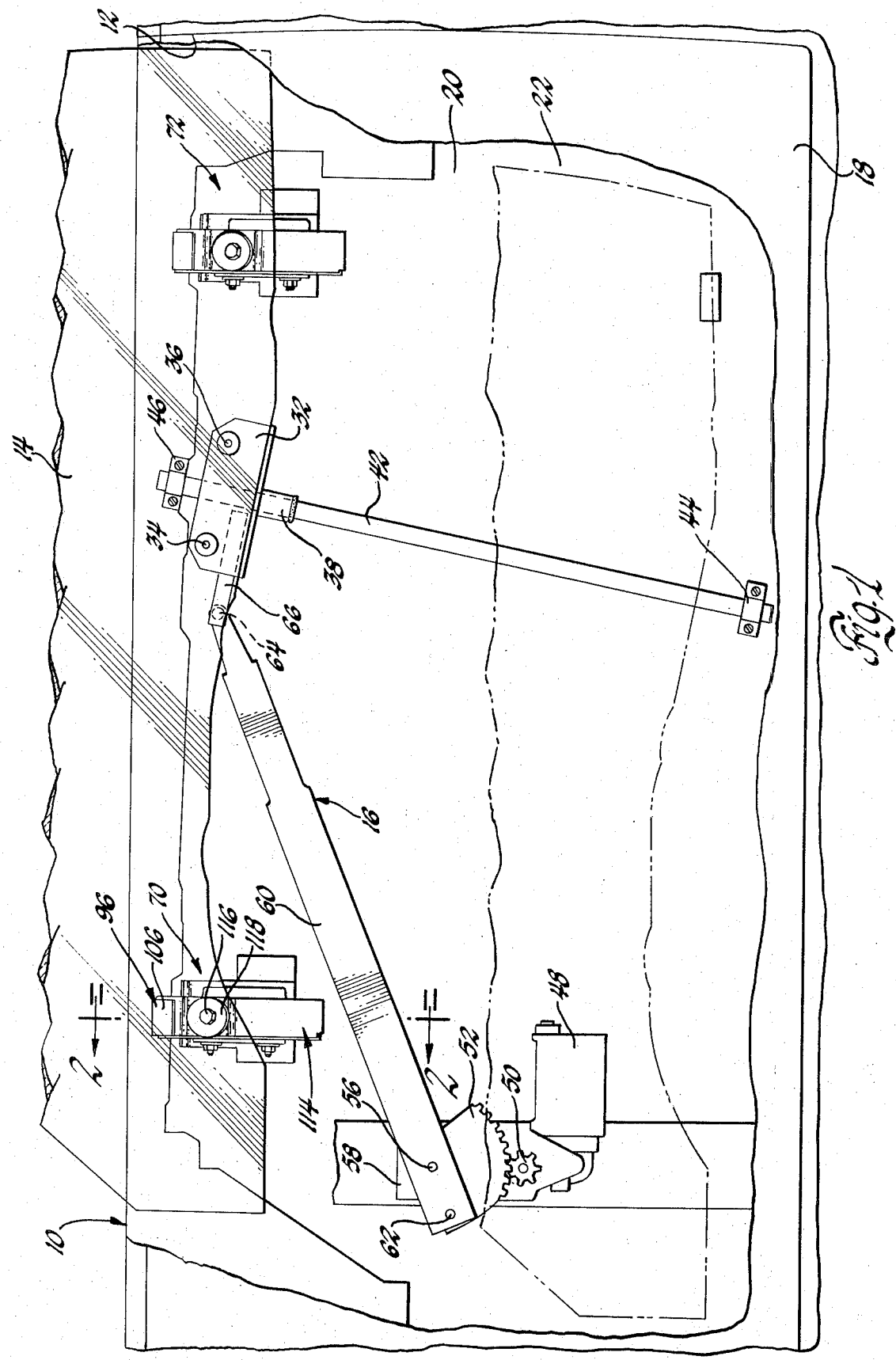

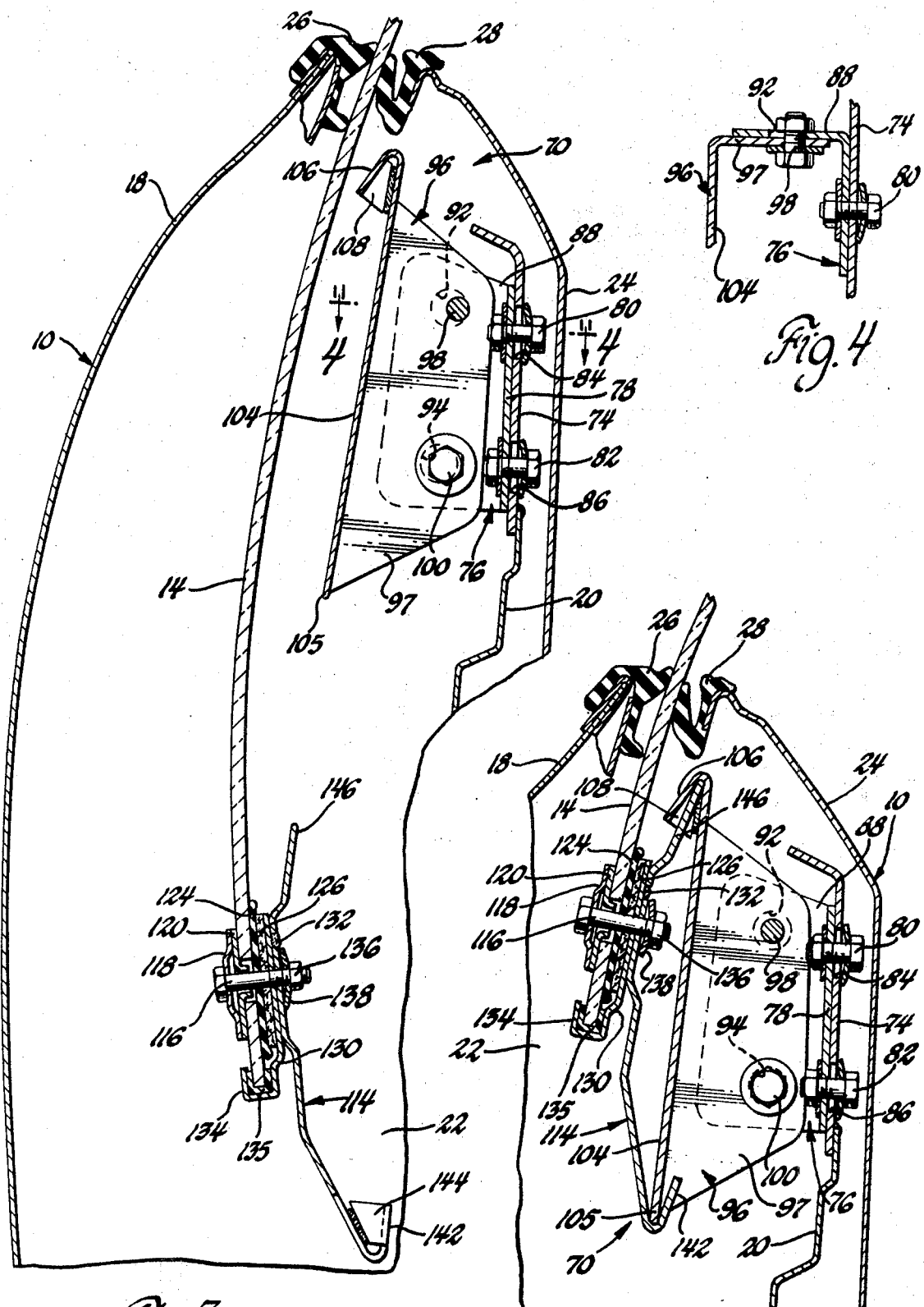

VEHICLE WINDOW STABILIZING MECHANISM

The invention relates to a vehicle window stabilizer for fixing the position of the window when in the raised position.

It is known to provide structure within the vehicle door to stabilize the window against movement when the window is in the raised position. It is desirable that such a stabilizing structure locate the window against movement in the lateral direction, inboard and outboard of the vehicle, and against pitch movement about an axis perpendicular to the window.

It is also desirable that such a stabilizing structure have no contact with the window itself in order to prevent abrasion of the window surface by foreign objects which may become embedded in any interface between the stabilizing structure and the window.

It is also desirable to provide a stabilizing structure which may be readily adjusted to facilitate fitting of the window to a particular window opening irrespective of dimensional variations between various vehicle bodies. According to the present invention a window stabilizing mechanism includes a stabilizer bracket nonrotatably attached to the lower edge portion of the window panel. A stabilizer stop is adjustably attached to the body. The lower edge portion of the stabilizer bracket is reversely bent to provide a retrorse flange opening upwardly toward the stabilizer stop. The upper edge portion of the stabilizer stop is reversely bent to provide a retrorse flange opening downwardly toward the window and the stabilizer bracket. When the window is moved upwardly to its raised position, the upper edge portion of the stabilizer bracket is received in the retrorse flange at the upper edge of the stabilizer stop while the retrorse flange at the lower edge of the stabilizer bracket captures the lower edge portion of the stabilizer stop. This interlocking engagement of the window mounted stabilizer bracket and the body mounted stabilizer stop prevent lateral inboard movement of the window panel. Stabilizing devices of this type are provided at both forward and rearward locations so as to prevent pitching movement of the window about an axis normal to the window. The adjustable attachment of the stabilizer stop to the door inner panel permits adjustment of the stabilizer stop to provide the desired stabilized position of the window.

IN THE DRAWINGS

FIG. 1 is a fragmentagy partially broken away side elevation view of a vehicle door embodying a stabilizer according to the invention, the window being shown in raised position;

FIG. 2 is a sectional view taken in the direction of arrows 2—2 of FIG. 1;

FIG. 3 is a view similar to FIG. 2 showing the window panel in the lowered position; and FIG. 4 is a sectional view taken in the direction of arrows 4—4 of FIG. 3.

Referring to FIG. 1, a vehicle body door 10 is located within a door opening 12 defined by the vehicle body. The door 10 is conventionally hinged at its forward edge to the vehicle body for swinging movement between an open position, not shown, and the closed position, shown in the drawing. When the door is in the closed position, a portion of the door opening is closed by a window 14 mounted on the door 10 in a manner to be described for movement between the raised position of FIG. 1 and the lowered position of FIG. 3 within the door. A window regulator assembly, generally designated 16, is mounted within the door and is operable to move the window between the raised and lowered positions.

As best seen in FIG. 3, the door 10 includes an outer panel 18 and an inner panel 20 which are spaced to provide a window storage space 22. An interior trim panel 24 is provided on the door inwardly the inner panel 20 to conceal the inner panel from the passenger compartment. The outer panel 18 and the trim panel 24 have affixed to their upper edge portions respective flexible sealing strips 26 and 28 which bear slidably, but firmly, against the opposite surfaces of the window 14 to provide a weather tight closure and prevent entry of foreign material into the storage space 22 between the outer and inner panels.

Referring to FIG. 1, a sash plate 32 is fixedly secured to the lower edge portion of the window panel 14 by conventional fasteners such as bolts 34 and 36. An annular collar 38 of low friction material, such as nylon is attached to the sash plate 32. This annular collar 38 encircles a guide member or rod 42 which is attached at its lower end to the inner panel 20 by a bracket 44 and has its upper end attached to the inner panel 20 by a similar bracket 46. The guide member 42 is mounted on the door inner panel at an angle so as to provide the desired path of window movement between the raised and lowered positions. The window regulator assembly 16 for raising and lowering the window glass 14 includes a conventional reversible electric motor and gearbox assembly 48 which includes an output pinion 50. The pinion 50 drives a toothed sector 52 which is pivoted at 56 to a mounting bracket 58, conventionally mounted on inner panel 20 and also mounting assembly 48. A lift arm 60 is attached to the sector 52 at 56 and 62 for rotation therewith. A roller 64 is mounted on the end of arm 60 and rides in a channel shaped track 66 which is attached as by welding to the sash plate 32.

It will be apparent that when the electric motor of assembly 48 is energized through a conventional electrical circuit, the pinion 50 will rotate the sector 52 about pivot 56. The lift arm 60 will also be rotated about pivot 56 and the roller 64 thereof will ride in the track 66 to lower the window 14 along a path defined by guide member 42.

A stabilizing mechanism according to this invention is provided to stabilize the window 14 in the raised position thereof shown in assembly in FIGS. 1 and 2. The stabilizing mechanism includes like forward and rearward stabilizer assemblies 70 and 72. Referring to FIGS 3 and 4, the forward stabilizer assembly 70 includes a mounting plate 74 attached to the inner panel 20 as by welding. An L-shaped support bracket 76 has a leg 78 juxtaposed to the mounting plate 74 and attached thereto by bolt, nut and washer assemblies 80 and 82 which extend respectively through oversized apertures 84 and 86 of the mounting plate 74. The other leg 88 of support bracket 76 has similar oversized apertures 92 and 94. An L-shaped stabilizer stop 96 includes a leg 97 attached to the leg 88 of support bracket 76 by bolt, nut and washer assemblies 98 aand 100 which extend through the oversized apertures 92 and 94 of leg 88 of the support bracket 76. The other leg 104 of stabilizer stop 96 provides a plate which extends generally parallel to the window 14 and has a lower edge portion 105. The upper edge portion of the leg 104 is reversely bent toward the window 14 to provide a retrorse flange 106 which opens downwardly and toward the window 14. An integral tab 108 of the retrorse flange 106 may be bent toward the plate 104 and welded thereto to strengthen the retrorse flange 106.

A stabilizer bracket 114 is attached to the forward lower edge of the window 14 by a bolt 116. A washer 118 and spacer 120 are interposed between the head of bolt 116 and the window 14 so as to distribute the attaching force over a sufficient area of the surface of the window 14 to prevent undue stress thereon. A hard rubber washer 124 and a hard fiber spacer 126 are interposed between the other side of the window 14 and the stabilizer bracket 114 to cushion the window 14 from shock loads on the stabilizer bracket 114 as well as distribute the attaching force of the bolt 116 over an area of the window 14. The stabilizer bracket 114 is mounted against rotation relative the window 14 by a bracket 130 which is interposed between the hard fiber spacer 126 and the bracket 114. The bracket 130 is attached to the stabilizer bracket 114 as by plug welding at 132 and has a flange portion 134 mounting a plastic cushion 135 which captures the lower edge of the window 14. A nut 136 and washer 138 received on the end of bolt 116 complete the attachment of the stabilizer bracket 114 to the window 14. The stabilizer bracket 114 has at its lower edge portion a reverse bend providing a retrorse flange 142 which opens upwardly and away from the window 14. An integral tab 144 of the retrorse flange 142 is welded to the stabilizer bracket 114 to reinforce the retrorse flange 142. The stabilizer bracket 114 also has an upper edge portion 146.

With reference to FIGS. 2 and 3 it will be seen that as the window 14 is moved from the lowered position of FIG. 3 to the raised position of FIG. 2, the stabilizer bracket 114 attached to the window 14 becomes interlocked in tongue and groove fashion with the stabilizer stop 97 attached to the door inner panel 20. As seen in FIG. 1 the upper edge portion 146 of the stabilizer bracket 114 becomes engaged in the downwardly opening retrorse flange 106 of the stabilizer stop 96. Simultaneously, the upwardly opening retrorse flange 142 of the stabilizer bracket 146 engages the lower edge portion 109 of the stabilizer stop 96.

Thus with the window in the raised position of FIG. 2 it will be apparent that lateral inboard and outboard movement of the window 14 is restrained by the interlocking engagement of the stabilizer bracket 114 with the stabilizer stop 96. It will also be apparent that the cooperation of the front stabilizer assembly 70 and the rear stabilizer assembly 72 will prevent pitching movement of the window panel 14 about an axis perpendicular to the window.

The attachment of the stabilizer stop 96 to the mounting plate 74 by the use of nut and bolt assemblies 80, 82, 98 and 100 in cooperation with the oversized apertures 84, 86, 92 and 94 permit limited adjustment of the stabilizer stop 96 to the position providing the desired stabilized position of the window when in the raised position.

Thus, it is seem that an improved window stabilizing mechanism is provided for a vehicle body.

What is claimed is:

1. In a vehicle body having a window opening and a window panel movable relative to a body panel between open and closed positions with respect to the window opening, the combination comprising: stop means attached to the body panel, the stop means having upper and lower edge portions and a retrorse flange at the upper edge opening downwardly and toward the window panel, a stabilizer means attached to the lower edge of the window panel, the stabilizer means having upper and lower edge portions and a retrorse flange at the lower edge portion opening upwardly and toward the body panel, the stop means and stabilizer means being positioned on their respective panels for interlocking engagement with one another when the window panel is in the raised position, the upper edge portion of the stabilizer means being received in the retrorse flange of the stop means and the retrorse flange of the stabilizer means engaging and capturing the lower edge portion of the stop means whereby vertical movement of the window panel to raised position is stopped and the window panel is stabilized against lateral movement when in the raised position.

2. In a vehicle body having a window opening and window panel movable relative a body panel between open and closed positions with respect to a window opening, the combination comprising: stop means, means adjustably mounting the stop means on the body panel, the stop means having upper and lower edge portions and a reverse bend at the upper edge portion providing a retrorse flange opening downwardly toward the window panel, stabilizer means attached to the lower edge of the window panel, the stabilizer means having upper and lower edge portions and a reverse bend at the lower edge portion providing a retrorse flange opening upwardly and away from the window panel, the stop means and stabilizer means being positioned on their respective panels for interlocking engagement when the window panel is in the raised position, the upper edge portion of the stabilizer means being received in the retrorse flange of the stop means and the retrorse flange of the stabilizer means engaging and capturing the lower edge portion of the stop means to stabilize the window glass against lateral movement when in the raised position, the means adjustably attaching the stop means to the body panel permitting adjustment of the stop means to permit lateral adjustment of the window panel to provide the desired stabilized raised position of the window panel.

3. In a vehicle body having a window opening and a window panel movable relative to a body panel between open and closed positions with respect to the window opening, the combination comprising: first stabilizing means acting between the body panel and the forward portion of the window panel and second stabilizing means acting between the body panel and the rearward portion of the window panel, each of said stabilizing means including a stabilizer stop having upper and lower edge portions, first and second means adjustably mounting the stabilizing stops of the first and second stabilizing means on the body panel, a reverse bend at the upper edge portion of each stabilizer stop providing a retrorse flange opening downwardly and toward the window panel, a stabilizer bracket attached to the lower edge of the window panel and having upper and lower edge portions, a reverse bend on the lower edge portion of the stabilizer bracket providing a retrorse flange opening upwardly and away from the window panel, the stabilizer stop and stabilizer bracket being positioned on the respective panels for interlocking engagement when the window panel is in the raised position, the upper edge portion of the stabilizer bracket being received in the retrorse flange of the stabilizer stop and the retrorse flange of the stabilizer bracket engaging the lower edge portion of the stabilizer stop to stabilize the window glass in the raised position against lateral movement inwardly and outwardly and pitch movement about an axis transverse to the window panel, the first and second means adjustably mounting the stabilizer stops on the body panel permitting individual adjustment of the stabilizer stops to permit adjustment of the window panel laterally or about a transverse axis to provide the desired raised position of the window panel.

* * * * *